US008917655B2

(12) United States Patent
Kwon

(10) Patent No.: US 8,917,655 B2
(45) Date of Patent: Dec. 23, 2014

(54) METHOD AND APPARATUS FOR ALLOWING DEVICE SUPPORTING MULTIPLE PHY COMMUNICATION MODE TO COMMUNICATE WITH DEVICE IN WIRELESS PERSONAL AREA NETWORK

(75) Inventor: Chang-yeul Kwon, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 853 days.

(21) Appl. No.: 12/501,662

(22) Filed: Jul. 13, 2009

(65) Prior Publication Data

US 2010/0008296 A1    Jan. 14, 2010

Related U.S. Application Data

(60) Provisional application No. 61/079,898, filed on Jul. 11, 2008.

(30) Foreign Application Priority Data

Nov. 11, 2008  (KR) .................. 10-2008-0111852

(51) Int. Cl.
*H04W 88/02* (2009.01)
*H04W 8/00* (2009.01)
*H04W 88/06* (2009.01)
*H04W 48/16* (2009.01)

(52) U.S. Cl.
CPC .............. *H04W 8/005* (2013.01); *H04W 88/06* (2013.01); *H04W 48/16* (2013.01)
USPC ........................... 370/328; 370/338; 370/252

(58) Field of Classification Search
USPC .......... 370/328, 329, 338, 331, 252; 373/260, 373/261, 316; 375/260, 261, 316
See application file for complete search history.

(56) References Cited

U.S. PATENT DOCUMENTS

| 7,463,886 | B2 * | 12/2008 | Salokannel et al. ........ 455/426.1 |
| 7,502,591 | B2 * | 3/2009 | Dabak et al. ................ 455/41.2 |
| 7,546,149 | B2 * | 6/2009 | Aerrabotu et al. ............ 455/574 |
| 7,664,030 | B2 * | 2/2010 | Sugaya ........................ 370/235 |
| 7,941,179 | B2 * | 5/2011 | Rofougaran et al. ...... 455/553.1 |
| 2004/0125820 | A1 | 7/2004 | Rios |
| 2004/0165564 | A1 | 8/2004 | Kim et al. |
| 2004/0218683 | A1 * | 11/2004 | Batra et al. .................... 375/261 |

(Continued)

FOREIGN PATENT DOCUMENTS

| KR | 10-2004-0076710 A | 9/2004 |
| KR | 10-2005-0040692 A | 5/2005 |
| KR | 10-0652013 B1 | 11/2006 |

OTHER PUBLICATIONS

Korean Decision of Grant, dated Nov. 30, 2010, issued in Application No. 10-2008-0111852.

*Primary Examiner* — Rasheed Gidado
(74) *Attorney, Agent, or Firm* — Sughrue Mion, PLLC

(57) ABSTRACT

Provided is an operation method of a wireless personal area network (WPAN) device. In the wireless personal area network (WPAN) device, the WPAN device supporting a plurality of physical layer (PHY) communication modes determines timing for changing a PHY communication mode, with reference to a beacon frame, in order to communicate with devices using various PHY communication modes, and transmits information indicating a PHY communication mode as a parameter of a primitive to a PHY layer, at the determined timing.

18 Claims, 5 Drawing Sheets

(56) References Cited

U.S. PATENT DOCUMENTS

| | | | |
|---|---|---|---|
| 2005/0026569 A1* | 2/2005 | Lim et al. | 455/73 |
| 2005/0058121 A1* | 3/2005 | Santhoff et al. | 370/352 |
| 2005/0094657 A1 | 5/2005 | Sung et al. | |
| 2005/0147071 A1* | 7/2005 | Karaoguz et al. | 370/338 |
| 2007/0082714 A1* | 4/2007 | Beach et al. | 455/574 |
| 2008/0212564 A1 | 9/2008 | Lee et al. | |
| 2009/0073920 A1* | 3/2009 | Goldhamer | 370/328 |
| 2010/0232304 A1* | 9/2010 | den Besten | 370/252 |

* cited by examiner

METHOD AND APPARATUS FOR ALLOWING DEVICE SUPPORTING MULTIPLE PHY COMMUNICATION MODE TO COMMUNICATE WITH DEVICE IN WIRELESS PERSONAL AREA NETWORK

CROSS-REFERENCE TO RELATED PATENT APPLICATION

This application claims the benefit of U.S. Provisional Patent Application No. 61/079,898, filed on Jul. 11, 2008, in the U.S. Patent and Trademark Office, and the benefit of Korean Patent Application No. 10-2008-0111852, filed on Nov. 11, 2008, in the Korean Intellectual Property Office, the disclosures of which are incorporated herein in their entirety by reference.

BACKGROUND OF THE INVENTION

1. Field of the Invention

The present invention relates to a method of allowing a device to communicate with another device in a wireless personal network (WPAN).

2. Description of the Related Art

A wireless personal area network (WPAN) is a wireless network in which devices arranged at short distances from one another perform data communication at low power. In a WPAN, devices belonging to a piconet share channels with each other by using a time division multiple access (TDMA) method. That is, devices willing to perform data communication occupy a channel exclusively for a channel time allocation (CTA) which is allocated by a device referred to as a piconet coordinator (PNC) to perform data communication.

Recently, as technologies for transmitting a large amount of data in a WPAN at a frequency of 60 Hz at high speed have been developed using millimeter waves having a short wavelength in the range of about 1 to about 10 mm and having significant directivity, various PHY communication modes such as a single carrier (SC) method, an orthogonal frequency division multiplexing (OFDM) method, and an on-off keying (OOK) method may be used in a WPAN.

Since devices using different PHY communication modes may not communication with each other, a device supporting a plurality of PHY communication modes may appropriately change a PHY communication mode, if necessary. However, conventionally, since it is assumed that all devices belonging to a piconet use a single PHY communication mode, an internal process is not be defined in order for the device supporting the PHY communication modes to communicate other devices in the piconet.

SUMMARY OF THE INVENTION

Exemplary embodiments of the present invention provide an internal process performed in order for a device supporting a plurality of physical layer (PHY) communication modes in a wireless personal area network (WPAN) to communicate with other devices using various physical layer (PHY) communication modes.

According to an aspect of the present invention, there is provided an operating method of a wireless personal network (WPAN) device, the method including determining timing for changing a physical layer (PHY) communication mode of the WPAN device from a first communication mode to a second communication mode; and transmitting information indicating the second communication mode as a parameter of a predetermined primitive from an upper layer of the device to a PHY layer, at the timing.

The WPAN device may operate as a device in a parent Piconet, and may operate as a Piconet coordinator (PNC) in a child Piconent of the parent Piconet, and, one of the first and second communication modes may be used to communicate with a PNC of the parent Piconet, and the other of the first and second communication modes may be used to communicate with devices belonging to the child Piconet.

The one of the first and second communication modes may be a PHY communication mode that is commonly supported by PNCs of all child Piconets belonging to the parent Piconet, and the other of the first and second communication modes may be one of a single carrier (SC) method, an on-off keying (OOK) method and an orthogonal frequency division multiplexing (OFDM) method. In an exemplary embodiment the first and the second communication modes are different modulation schemes.

The timing may be determined based on a beacon frame transmitted by a PNC of the parent Piconent.

The primitive may be PHY-TX-START.request or PHY-RX-START.request.

The primitive may include a plurality of pieces of information regarding a plurality of subframes included in a MAC frame body of a single data frame, as parameters, wherein the number of the parameters may be the same as the number of the subframes.

According to another aspect of the present invention, there is provided a computer readable recording medium having recorded thereon a program for executing the operating method of a wireless personal network (WPAN) device.

According to another aspect of the present invention, there is provided an apparatus of controlling a wireless personal network (WPAN) device, the apparatus including a determining unit determining timing for changing a physical layer (PHY) communication mode of the WPAN device from a first communication mode to a second communication mode; and a primitive processing unit transmitting information indicating the second communication mode as a parameter of a predetermined primitive from an upper layer of the device to a PHY layer, at the timing.

The WPAN device may operate as a device in a parent Piconet, and may operate as a Piconet coordinator (PNC) in a child Piconent of the parent Piconet, and one of the first and second communication modes may be used to communicate with a PNC of the parent Piconet, and the other of the first and second communication modes may be used to communicate with devices belonging to the child Piconet.

The one of the first and second communication modes may be a PHY communication mode that is commonly supported by PNCs of all child Piconets belonging to the parent Piconet, and the other of the first and second communication modes may be one of a single carrier (SC) method, an on-off keying (OOK) method and an orthogonal frequency division multiplexing (OFDM) method.

The determining unit may determine the timing, based on a beacon frame transmitted by a PNC of the parent Piconent.

The primitive may be PHY-TX-START.request or PHY-RX-START.request.

The primitive may include a plurality of pieces of information regarding a plurality of subframes included in a MAC frame body of a single data frame, as parameters, wherein the number of the parameters may be the same as the number of the subframes.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, the present invention will be described in detail by explaining exemplary embodiments of the invention with reference to the attached drawings.

Figure 1A:
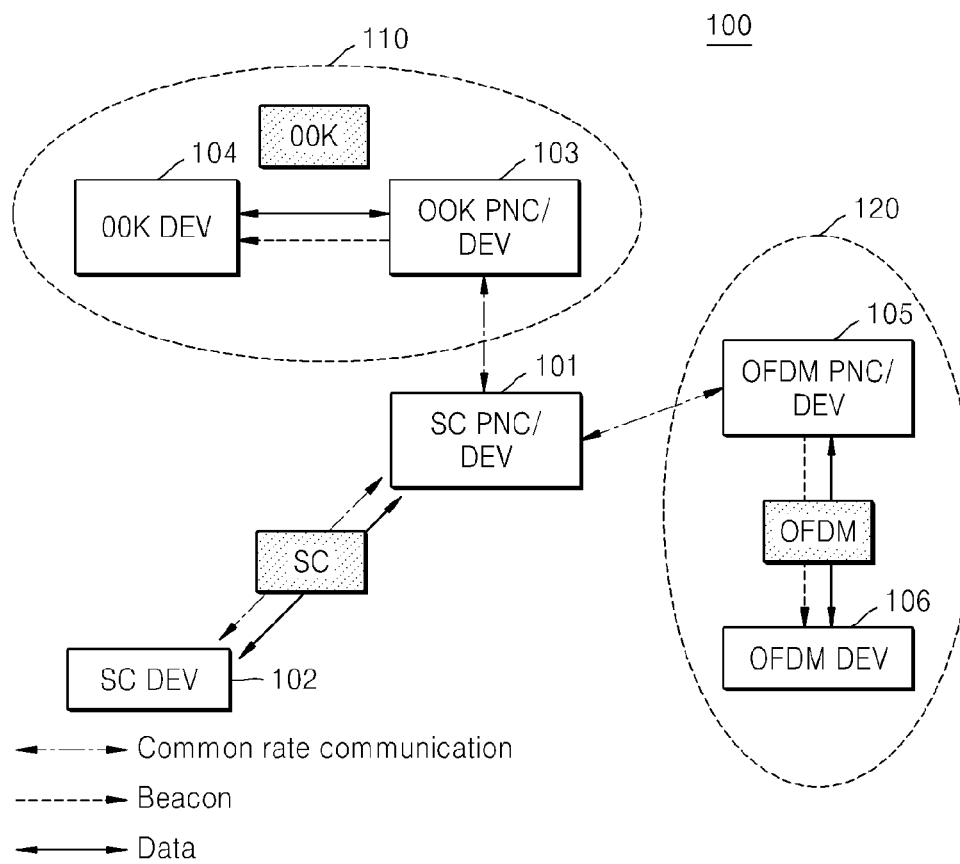
FIGS. 1A and 1B are diagrams for explaining a method of allowing a device to communicate with another device in a piconet, according to an exemplary embodiment of the present invention.
Figure 1B:
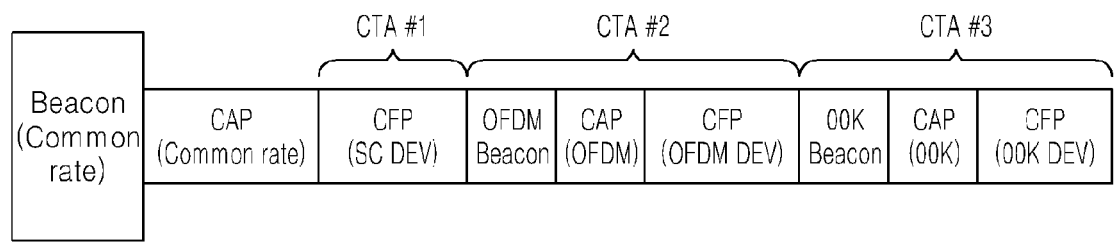

FIGS. 1A and 1B are diagrams for explaining a method of allowing a device to communicate with another device in a Piconet, according to an exemplary embodiment of the present invention.

Referring to FIG. 1A, six devices 101 through 106 constitute a parent Piconet 100. The parent Piconet 100 includes two child pinconets 110 and 120.

The six devices 101 through 106 are divided into a single carrier (SC), on-off keying (OOK), orthogonal frequency division multiplexing (OFDM), etc. according to a physical layer protocol, that is, a physical layer (PHY) communication mode. Hereinafter, a device using a PHY communication mode of a SC method, a device using a PHY communication mode of an OOK method, and a device using a PHY communication mode of an OFDM method will be referred to as a SC device, an OOK device, and an OFDM device, respectively.

In FIG. 1A, devices using different PHY communication modes may not communicate with each other, a device 101 using a PHY communication mode of the SC method may communicate with only a SC device 102. However, a channel time for communication may not be allocated to other devices that may not communicate with the device 101 currently operating as a Piconet coordinator (PNC) of the parent Piconet 100. Thus, in a wireless personal area network (WPAN) according to the present exemplary embodiment, devices using the same PHY communication mode constitute the child Piconet 110 or 120, and devices 103 and 105 supporting PNC functions of the child Piconet 110 and 120 perform the PNC functions of the child Piconet 110 and 120, respectively. Thus, in the WPAN, the device 101 operates as the PNC of the parent Piconet 110, the device 103 operates as the PNC of the child Piconet 110, and the device 105 operates as the PNC of the child Piconet 120.

Since channel times are generally allocated to devices from a PNC by signaling in a WPAN, signaling may be performed at least between the device 101 that is the PNC of the parent Piconet 100 and the devices 103 and 105 that are the PNCs of the child Piconets 110 and 120. The signaling contrasts with data communication, and refers to a method of transmitting and receiving a message for constructing/controlling a communication environment in Piconet. In the signaling, beacon, probe request/response, association request/response, etc. are transmitted between PNCs and devices.

In the WPAN according to the present embodiment, the devices 101, 102 and 103 supporting PNC functions may support at least one PHY communication mode that is common to the devices 101, 102 and 103. Hereinafter, the PHY communication mode will be referred to as a common rate mode. For example, the common rate mode may be determined as a PHY communication mode of a SC method with a rate of 50 Mbps.

Channel times are allocated from the device 101 that is the PNC of the parent Piconet 100 to the devices 103 and 105 that are the PNCs of the child Piconets 110 and 120 by the signaling using the common rate mode. The length of each of the channel times allocated to the devices 103 and 105 that are the PNCs of the child Piconets 110 and 120 is the same as that of a super frame of each of the child Poconets 110 and 120. In a child Poconet, both signaling and data communication are performed by using a PHY communication mode common to devices belong to the child Piconet. That is, in FIG. 1A, signaling and data communication are performed in the child Piconet 110 by using an OOK method, and are performed in the child Piconet 120 by using an OFDM method.

FIG. 1B is a diagram for explaining the super frame of the parent Piconet 100 illustrated in FIG. 1A, according to an embodiment of the present invention. Referring to FIGS. 1A and 1B, the device 101 that is the PNC of the parent Piconet 100 broadcasts a beacon frame to the parent Piconet 100 by using the common rate mode. If the common rate mode is a SC method using a basic rate, only the SC device 102 and the devices 103 and 105 supporting the PNC function may interpret the beacon frame.

In a contention access period (CAP), channel times CTA #1, CTA #2 and CTA #3 are allocated to the SC device 102, the device 105 (hereinafter, referred to as the OFDM PNC/DEV 105) and the device 103 (hereinafter, referred to as the OOK PNC/DEV 103), respectively. For reference, the "OFDM PNC/DEV" refers to a device using the OFDM method and supporting the PNC function. Thus, the OFDM PNC/DEV 105 uses the PHY communication mode of the OFDM method, but supports the PNC function. Thus, the OFDM PNC/DEV 105 may also support the common rate mode. Also, the OOK PNC/DEV 103 may support both the PHY communication mode of the OOK method and the common rate mode.

As described above, the length of a channel time allocated to a PNC of a child Piconet corresponds to that of a super frame of the child Piconet. Thus, the CTA #2 is a super frame of the child Piconet 120, and the CTA #3 is a super frame of the child Piconet 110. Signaling and data communication may be performed between devices of the child Piconet 110 by using the OOK method, and may be performed between devices of the child Piconet 120 by using the OFDM method.

Figure 2:
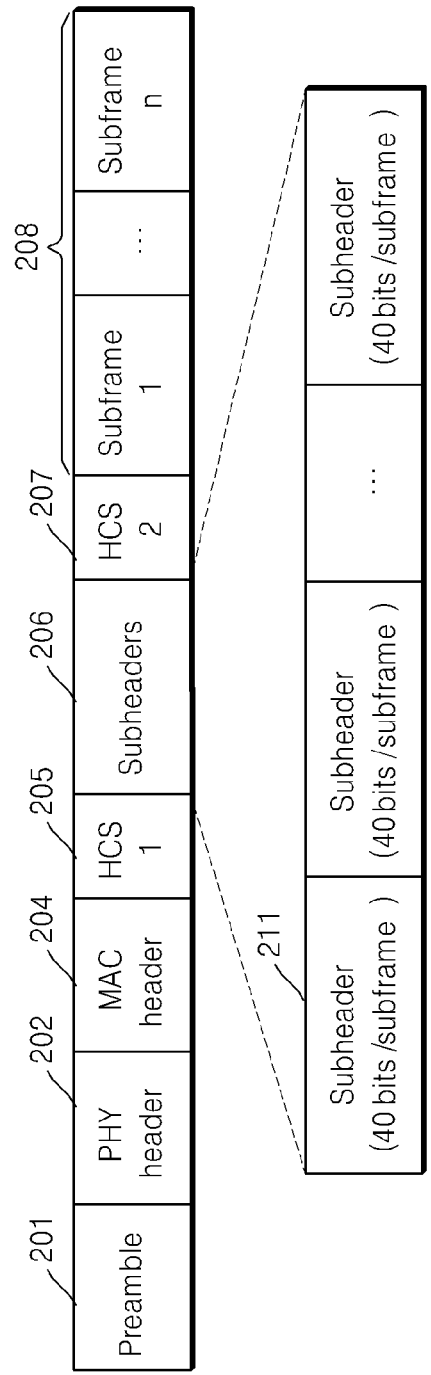
FIG. 2 is a diagram for explaining a data frame, according to an exemplary embodiment of the present invention.

FIG. 2 is a diagram for explaining a data frame, according to an embodiment of the present invention.

Referring to FIG. 2, the data frame includes a preamble 201, a PHY header 202, a media access control (MAC) header 204, a header check sequence (HCS)1 (205), subheaders 206, a HCS2 207 and subframes 208.

The PHY header 202 may include a subheader flag (not shown) indicating whether the subheaders 206 are contained in a data frame.

The HCS1 205 is a field in which a HCS that is a CRC code for detecting an error of the preamble 201, the PHY header 202 and the MAC header 204 is recorded. The HCS2 207 is a field in which a HCS that is a CRC code for detecting an error of the subheaders 206 is recorded.

A subheader 211 included in the subheaders 206 may contain information indicating a modulation and coding scheme used in a subframe, information indicating whether a subframe includes a frame check sequence (FCS), and information indicating, if a subframe is one of fragmentations of MAC service data unit (MSDU), the order of the subframe in the fragmentations.

That is, the data frame according to the present exemplary embodiment may include a plurality of subframes in a MAC frame body thereof. The subframes may be generated from at least one MSDU.

In FIG. 2, 40 bits are allocated for each respective subframe, but the bit number is not limited thereto.

Figure 3:
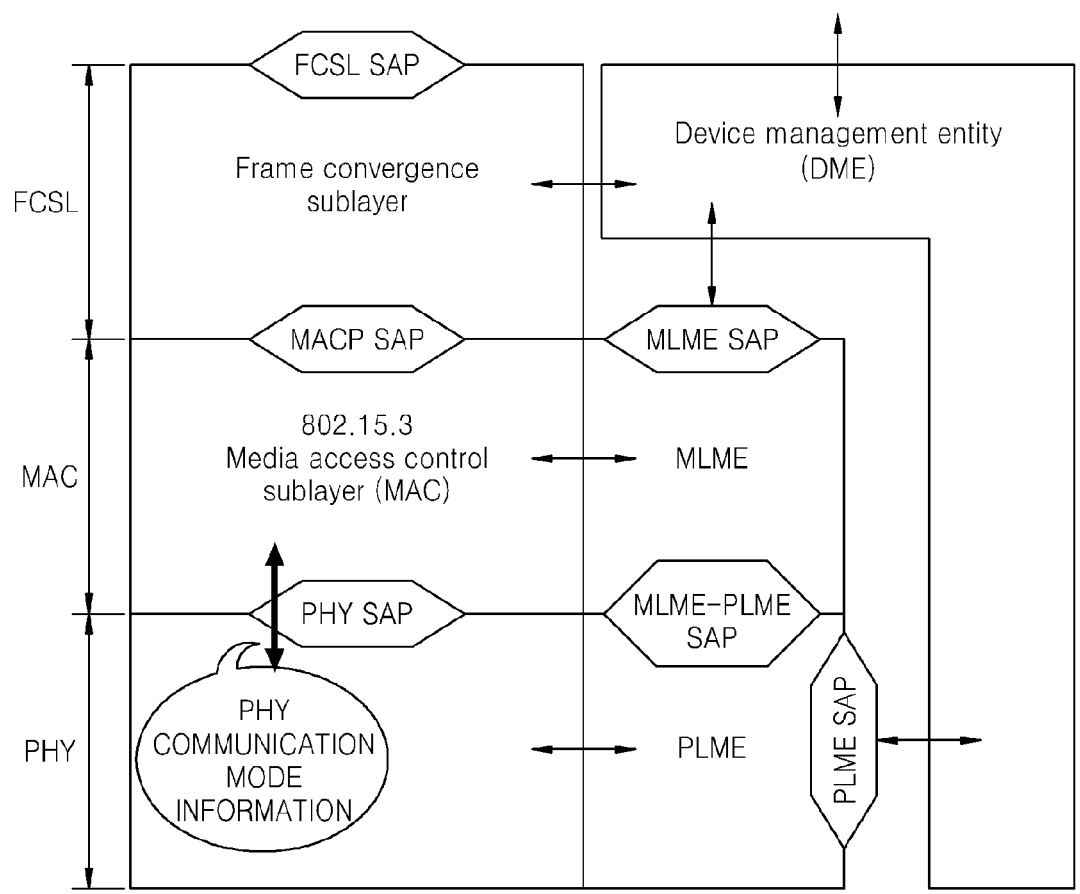
FIG. 3 is a diagram for explaining a method of changing a physical layer (PHY) communication mode, which is performed in a wireless personal network (WPAN) device supporting a plurality of PHY communication modes, according to an exemplary embodiment of the present invention.

FIG. 3 is a diagram for explaining a method of changing a PHY communication mode, which is performed in a WPAN device supporting a plurality of PHY communication modes, according to an embodiment of the present invention.

Referring to FIG. 3, in the WPAN device, a MAC layer and a PHY layer include management entities referred to as a MAC layer management entity (MLME) and a PHY layer management entity (PLME), respectively. The WPAN includes a device management entity (DME) that is independent upon a layer and for obtaining correct MAC operations.

In FIG. 3, various entities interact with each other by exchanging commands referred to as a primitive via a service access point (SAP).

For example, PHY-TX-START.request is a primitive used when a MAC layer requests for a PHY layer to start transmitting MAC protocol data unit. PHY-TX-START.request includes various parameters such as TXDataRate, TXLengh, TXPowerLevel, TXMACHead, TXAntSelect, or the like.

The TXDataRate is a rate used to transmit a frame. The TXLengh indicates the length of a MAC frame to be transmitted. The TXPowerLevel indicates transmission power used to transmit a frame. The TXAntSelect determines an antenna sued to transmit data.

For example, the PHY-RX-START.request is a primitive used when the MAC layer requests for the PHY layer to activate a receiver and start receiving a frame. In the PHY-RX-START.request, a RXAntSelect parameter is used to determine an antenna to be used to receive data.

As another example, PHY-RX-START.indication is a primitive used to notify the MAC layer that the PHY layer receives valid PHY and MAC header. The PHY-RX-START.indication includes parameters such as RXDataRate, RXLength, RXMACHead, RSSI, etc.

The RXDataRate indicates a rate of a received frame. The RXLength indicates the length of the received frame. The RXMACHead is a MAC header of the received frame. The RSSI indicates a power level of a received signal.

Various primitives and parameters used in a WPAN are disclosed in the IEEE 802.15.3 standard, and thus a detailed description thereof will not be given.

As described in the background of the invention, since it is assumed that a conventional WPAN device use a single PHY communication mode, a primitive or parameter related to a PHY transmission mode is not defined. Thus, according to the present exemplary embodiment, a device supporting a plurality of PHY communication modes may change a PHY transmission mode while maintaining compatibility with conventional IEEE 802.15.3 standard, the device may transmit information regarding the PHY communication mode as a parameter of a primitive exchanged between the MAC layer and the PHY layer.

That is, as illustrated in FIG. 3, the MAC layer of the WPAN device transmits the PHY communication mode information as the parameter of the primitive to the PHY layer, and the PHY layer also transmits the PHY communication mode information as the parameter of the primitive to the MAC layer.

For example, the MAC requests for the PHY layer to transmit a frame by using a corresponding PHY communication mode while transmitting the PHY communication mode information as a parameter of the PHY-TX-START.request. In addition, the MAC layer requests for the PHY layer to receive the frame while transmitting the PHY communication mode information as the parameter of the PHY-RX-START.request.

The PHY communication mode information may be a parameter of the PHY-RX-START.indication. That is, the PHY layer of the device may transmit the PHY communication mode information indicating a PHY communication mode used to receive a frame as the parameter of the PHY-RX-START.indication to the MAC layer.

When a data frame including a plurality of subframes is received, the PHY layer may transmit MAC subheaders as the parameter of the PHY-RX-START.indication to the MAC layer. In this case, the number of the MAC subheaders is the same as that of the subframes, and thus the number of parameters is required by as much as the number of the subframes.

Figure 4:
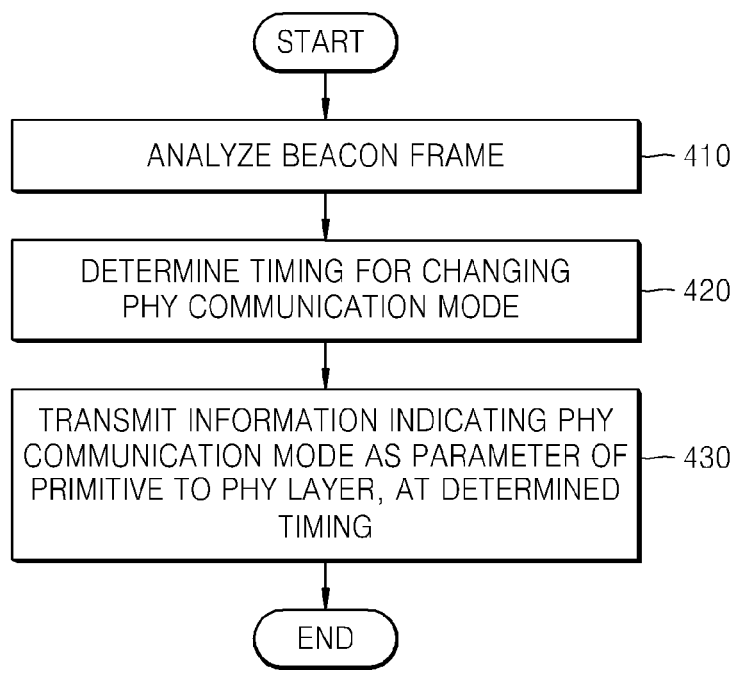
FIG. 4 is a flowchart for explaining an operation of a WPAN device, according to an exemplary embodiment of the present invention.

FIG. 4 is a flowchart for explaining an operation of a WPAN device, according to an exemplary embodiment of the present invention.

In operation 410, the WPAN device according to the present exemplary embodiment analyses a beacon frame transmitted from a PNC.

In operation 420, the WPAN device determines timing for changing a PHY communication mode, with reference to the beacon frame.

In operation 430, a MAC layer of the WPAN device transmits, to a PHY layer, information indicating a corresponding PHY communication mode as a parameter of a primitive, at the determined timing.

For example, the OFDM PNC/DEV 105 of FIG. 1 may recognize that the CTA #2 is allocated to the child Piconet 120 in which the OFDM PNC/DEV 105 operates a PNC, with reference to the beacon frame received from the device 101 operates as the PNC of the parent Piconet 110. Thus, the OFDM PNC/DEV 105 determines a point at which the CTA #2 starts as timing at which a PHY communication mode is changed from the common rate mode to the OFDM mode, and communicates with an OFDM device 106 for the CTA #2 by using the OFDM mode.

Figure 5:
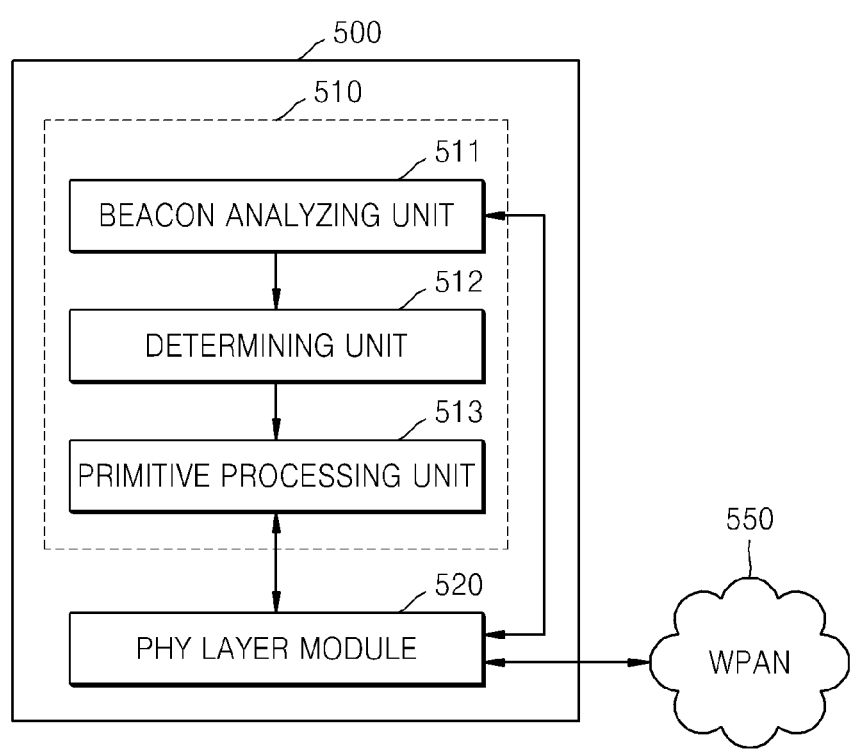
FIG. 5 is a structural view of a WPAN device according to an exemplary embodiment of the present invention.

FIG. 5 is a structural view of a WPAN device 500 according to an embodiment of the present invention.

Referring to FIG. 5, the WPAN device 500 includes a MAC layer module 510 and a PHY layer module 520. The MAC layer module 510 controls the WPAN device 500 supporting a plurality of PHY communication modes so as to communicate with another device in Piconet where devices using various PHY communication modes exist. The PHY layer module 520 performs processes processed in the PHY layer of the WPAN device 500.

The MAC layer module 510 includes a beacon analyzing unit 511, a determining unit 512 and a primitive processing unit 513.

The beacon analyzing unit 511 analyses a beacon transmitted by a PNC of a WPAN 550.

The determining unit 512 determines timing for changing a PHY communication mode, according to a result of analysis of the beacon analyzing unit 511.

For example, when the WPAN device 500 operates as a device in a parent Piconet, and operates as a PNC in a child Piconet using an OFDM method, the WPAN device 500 communicates with the PCN of the parent Piconet by using the common rate mode, but the WPAN device 500 communicates with a device of the child Piconet by using the OFDM method. Thus, a point at which a channel time allocated to the WPAN 500, that is, a super frame of the child Piconet starts is determined as timing for changing a PHY transmitting mode.

The primitive processing unit 513 transmits information indicating the PHY communication mode to be changed as a parameter of a primitive to the PHY layer module 520, at the timing determined by the determining unit 512.

As described above, the primitive may be the PHY-TX-START.request or the PHY-RX-START.request. In addition, the information indicating the PHY communication mode may indicate a single carrier (SC), on-off keying (OOK) or orthogonal frequency division multiplexing (OFDM).

In the above embodiments, the case where a device supports two PHY communication modes is described. Alternatively, a device may support three or more of PHY communication modes.

The exemplary embodiments of the invention can also be embodied as computer readable codes on a computer readable recording medium. The computer readable recording medium is any data storage device that can store data which can be thereafter read by a computer system.

Examples of the computer readable recording medium include read-only memory (ROM), random-access memory (RAM), CD-ROMs, magnetic tapes, floppy disks, optical data storage devices, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of a wireless personal network (WPAN) device, the method comprising:
    determining timing for changing a physical layer (PHY) communication mode of the WPAN device from a first communication mode to a second communication mode; and
    transmitting information indicating the second communication mode as a parameter of a predetermined primitive from an upper layer of the WPAN device to a PHY layer, at the timing,
    wherein the timing for changing the PHY communication mode is a point at which a channel time allocated to the WPAN starts, and
    wherein the first communication mode and the second communication mode are the PHY communication mode, and one of the first communication mode and the second communication mode is one of a single carrier (SC) method and an orthogonal frequency division multiplexing (OFDM) method.

2. The method of claim 1, wherein the WPAN device operates as a WPAN device in a parent Piconet, and operates as a Piconet coordinator (PNC) in a child Piconet of the parent Piconet, and
    wherein one of the first and the second communication modes is used to communicate with a PNC of the parent Piconet, and the other of the first and the second communication modes is used to communicate with devices belonging to the child Piconet.

3. The method of claim 2, wherein the one of the first and the second communication modes is a PHY communication mode that is supported by PNCs of all child Piconets belonging to the parent Piconet and the one of the first communication mode and the second communication mode is one of a single carrier (SC) method, an on-off keying (OOK) method and an orthogonal frequency division multiplexing (OFDM) method.

4. The method of claim 1, wherein the timing is determined based on a beacon frame transmitted by a PNC of the parent Piconet.

5. The method of claim 1, wherein the predetermined primitive is a PHY-TX-START.request command or a PHY-RX-START.request command.

6. The method of claim 1, wherein the one of the first and the second communication modes is a PHY communication mode that is supported by PNCs of all child Piconets belonging to a parent Piconet.

7. A method of a wireless personal network (WPAN) device, the method comprising:
    determining timing for changing a physical layer (PHY) communication mode of the WPAN device from a first communication mode to a second communication mode; and
    transmitting information indicating the second communication mode as a parameter of a predetermined primitive from an upper layer of the WPAN device to a PHY layer, at the timing,
    wherein the predetermined primitive comprises a plurality of pieces of information regarding a plurality of subframes included in a MAC frame body of a single data frame, as parameters, wherein a number of the parameters is same as a number of the subframes, and
    wherein the first communication mode and the second communication mode are the PHY communication mode, and one of the first communication mode and the second communication mode is one of a single carrier (SC) method and an orthogonal frequency division multiplexing (OFDM) method.

8. An apparatus of controlling a wireless personal network (WPAN) device, the apparatus comprising:
    a determining unit which determines timing for changing a physical layer (PHY) communication mode of the WPAN device from a first communication mode to a second communication mode; and
    a primitive processing unit which transmits information indicating the second communication mode as a parameter of a predetermined primitive from an upper layer of the WPAN device to a PHY layer, at the timing,
    wherein the timing for changing the PHY communication mode is a point at which a channel time allocated to the WPAN starts, and
    wherein the first communication mode and the second communication mode are the PHY communication mode, and one of the first communication mode and the second communication mode is one of a single carrier (SC) method and an orthogonal frequency division multiplexing (OFDM) method.

9. The apparatus of claim 8, wherein the WPAN device operates as a WPAN device in a parent Piconet, and operates as a Piconet coordinator (PNC) in a child Piconet of the parent Piconet, and
    wherein one of the first and the second communication modes is used to communicate with a PNC of the parent Piconet, and the other of the first and the second communication modes is used to communicate with devices belonging to the child Piconet.

10. The apparatus of claim 9, wherein the one of the first and the second communication modes is a PHY communication mode that is commonly supported by PNCs of all child Piconets belonging to the parent Piconet, and the one of the first communication mode and the second communication mode is one of a single carrier (SC) method, an on-off keying (OOK) method and an orthogonal frequency division multiplexing (OFDM) method.

11. The apparatus of claim 8, wherein the determining unit determines the timing, based on a beacon frame transmitted by a PNC of the parent Piconet.

12. The apparatus of claim 8, wherein the predetermined primitive is a PHY-TX-START.request command or a PHY-RX-START.request command.

13. The apparatus of claim 8, wherein the one of the first and the second communication modes is a PHY communication mode that is supported by PNCs of all child Piconets belonging to a parent Piconet.

14. An apparatus of controlling a wireless personal network (WPAN) device, the apparatus comprising:
   a determining unit which determines timing for changing a physical layer (PHY) communication mode of the WPAN device from a first communication mode to a second communication mode; and
   a primitive processing unit which transmits information indicating the second communication mode as a parameter of a predetermined primitive from an upper layer of the WPAN device to a PHY layer, at the timing,
   wherein the predetermined primitive comprises a plurality of pieces of information regarding a plurality of subframes included in a MAC frame body of a single data frame, as parameters, wherein a number of the parameters is same as a number of the subframes, and
   wherein the first communication mode and the second communication mode are the PHY communication mode, and one of the first communication mode and the second communication mode is one of a single carrier (SC) method and an orthogonal frequency division multiplexing (OFDM) method.

15. A non-transitory computer readable recording medium having recorded thereon a program executed by a processor for executing a method of a wireless personal network (WPAN) device, the method comprising:
   determining timing for changing a physical layer (PHY) communication mode of the WPAN device from a first communication mode to a second communication mode; and
   transmitting information indicating the second communication mode as a parameter of a predetermined primitive from an upper layer of the WPAN device to a PHY layer, at the timing,
   wherein the timing for changing the PHY communication mode is a point at which a channel time allocated to the WPAN starts, and
   wherein the first communication mode and the second communication mode are the PHY communication mode, and one of the first communication mode and the second communication mode is one of a single carrier (SC) method and an orthogonal frequency division multiplexing (OFDM) method.

16. A method of wireless network, the method comprising:
   determining when a physical layer (PHY) communication mode of a wireless device changes from a first modulation scheme to a second modulation scheme; and
   transmitting information indicating when the physical layer communication mode changes, the information being transmitted from an upper layer of a model to a lower layer of the model,
   wherein the determining when the PHY communication mode changes is a point at which a channel time allocated to the wireless device starts, and
   wherein the first communication mode and the second communication mode are the PHY communication mode, and one of the first communication mode and the second communication mode is one of a single carrier (SC) method and an orthogonal frequency division multiplexing (OFDM) method.

17. The method of claim 16, wherein the lower layer is a PHY layer and the wireless device communicates using the first modulation scheme with a device in a parent wireless network and communicates using the second modulation scheme with a device in a child wireless network.

18. The method of claim 17, wherein the physical layer (PHY) communication mode of the wireless device changes according to a beacon frame.

* * * * *